US 6,734,768 B2

(12) United States Patent
Kim

(10) Patent No.: US 6,734,768 B2
(45) Date of Patent: May 11, 2004

(54) REMOTE CONTROLLER OF CIRCUIT BREAKER

(75) Inventor: Ki Young Kim, Cheongju (KR)

(73) Assignee: LG Industrial Systems Co., Ltd., Seoul (KR)

(*) Notice: Subject to any disclaimer, the term of this patent is extended or adjusted under 35 U.S.C. 154(b) by 34 days.

(21) Appl. No.: 10/225,278

(22) Filed: Aug. 22, 2002

(65) Prior Publication Data

US 2003/0123209 A1 Jul. 3, 2003

(30) Foreign Application Priority Data

Dec. 31, 2001 (KR) .................................. 10-2001-89289

(51) Int. Cl.$^7$ ................................................ H02H 3/00
(52) U.S. Cl. ............................. 335/6; 335/14; 361/115
(58) Field of Search ...................... 335/6, 14; 361/102, 361/115, 170, 182

(56) References Cited

U.S. PATENT DOCUMENTS 5,841,616 A * 11/1998 Crosier ...................... 361/102

* cited by examiner

Primary Examiner—Ramon M. Barrera
(74) Attorney, Agent, or Firm—Birch, Stewart, Kolasch & Birch, LLP

(57) ABSTRACT

In a remote controller of a circuit breaker capable of making an maintenance man control a circuit breaker instantly and safely at any place without approaching a certain area such as a control board or a control room, the circuit breaker includes a receiver for receiving a radio control signal for turning on/off or tripping a circuit breaker; a control unit for generating a first control signal or a second control signal depending on the radio control signal inputted from the receiver; a motor driver for controlling the on/off operation of the circuit breaker depending on the first control signal; and a trip unit for tripping the circuit breaker depending on the second control signal.

19 Claims, 3 Drawing Sheets

REMOTE CONTROLLER OF CIRCUIT BREAKER

BACKGROUND OF THE INVENTION

1. Field of the Invention

The present invention relates to a circuit breaker, and in particular to a remote controller of a circuit breaker which is capable of making a maintenance man control a circuit breaker at a remote position without approaching a circuit breaker or a control board.

2. Description of the Prior Art

In general, a circuit breaker consists of an insulating container and a breaking switch and a trip unit, etc. disposed therein, when an electrical circuit from an electric source and to an electric load is in one of an overload and a disconnected state, etc. or a short circuit occurs, the circuit breaker automatically breaks the circuit.

The circuit breaker can be largely divided into a MCCB (molded case circuit breaker) for protecting the above mentioned circuit and an ELB (Earth Leakage Breaker) for preventing electric shock and fire occurrence by sensing the earth leakage.

FIG. 1 is a block diagram illustrating a controller of a circuit breaker in accordance with the prior art.

As depicted in FIG. 1, the controller of the circuit breaker 104 includes a trip unit 103 for tripping the circuit breaker 104 according to an electric signal transmitted through a wire signal line according to a switch operation of a maintenance man when the maintenance man operates the switch (to on position or off position) installed at a control board in order to control the circuit breaker 104 at a remote position; and a motor driver 102 for receiving power from a power supply unit 101 and for opening or closing the circuit breaker 104 according to the electric signal inputted through the signal line. Herein, the motor driver 102 and the trip unit 103 is disposed in the circuit breaker 104 or installed at the outside of the circuit breaker 104. Hereinafter, the operation of the controller of the circuit breaker 104 in accordance with the prior art will be described.

First, in order to operate the circuit breaker 104 at a remote position, when the maintenance man operates the switch installed at the control board, an electric signal is generated by the switch operation. Herein, the trip unit 103 receives the electric signal through the signal line and operates the circuit breaker 104.

In the meantime, the motor driver 102 receives power from the power supply unit 101 according to the electric signal inputted from the control board and opens/closes the circuit breaker 104. Herein, the maintenance man can also manually operate the circuit breaker 104 by operating a handle installed at the circuit breaker 104.

However, because the conventional controller controls the circuit breaker according to the electric signal inputted through the signal line, a computer or the maintenance man to manage a power system has to reside at such a position adjacent to the control board in order to operate the circuit breaker directly. That is, there is inconveniency for the maintenance man to reside in a limited area so that he could operate the circuit breaker directly, In addition, in the conventional controller of the circuit breaker, when there is a need to turn on/off the circuit breaker urgently, namely, in an emergency, first of all the maintenance man has to approach a control board or a control room and operate a switch in order to control the circuit breaker, and accordingly it may impossible to control the circuit breaker instantly in the emergency. In more detail, if the maintenance man does not residue in a place adjacent to the control board or the control room, there is no way to control the circuit breaker in the emergency.

SUMMARY OF THE INVENTION

In order to solve the above-mentioned problem, it is an object of the present invention to provide a remote controller of a circuit breaker which is capable of making the maintenance man control a circuit breaker quickly and safely at any place without approaching a certain place such as a control room or a control board In order to achieve the above-mentioned object, a remote controller of a circuit breaker in accordance with the present invention includes a receiver for receiving a radio control signal for turning on/off or tripping a circuit breaker; a control unit for generating a first control signal or a second control signal on the basis of the radio control signal inputted from the receiver; a motor driver for controlling the on/off operation of the circuit breaker on the basis of the first control signal; and a trip unit for tripping the circuit breaker on the basis of the second control signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Hereinafter, the preferred embodiments of a remote controller of a circuit breaker in accordance with the present invention will be described in detail with reference to accompanying FIGS. 2~4.

Figure 1:
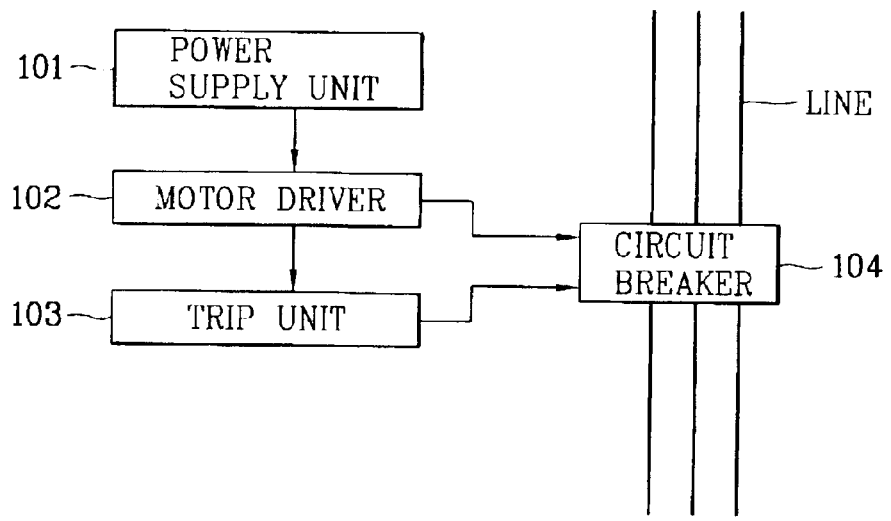
FIG. 1 is a block diagram illustrating a remote controller of a circuit breaker in accordance with the prior art.
Figure 2:
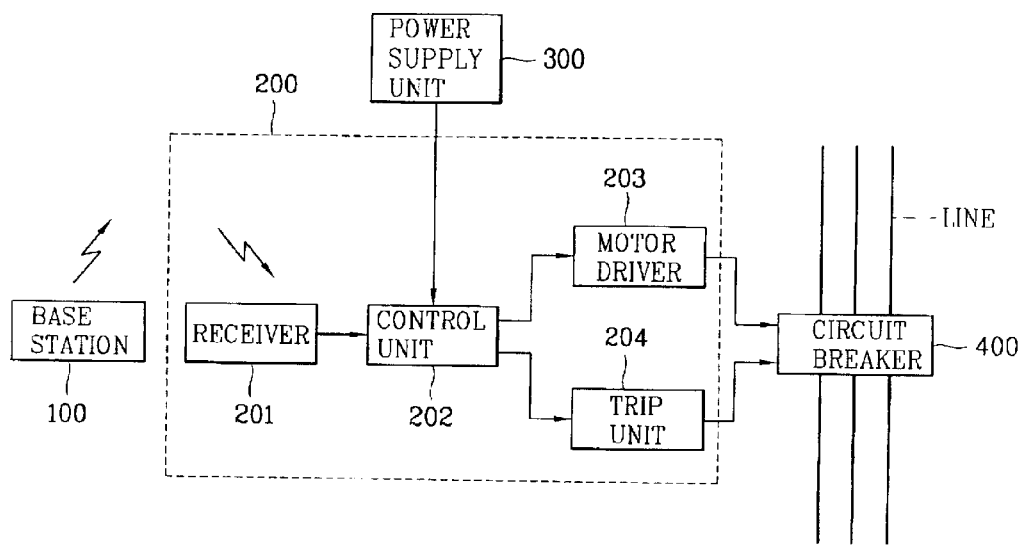
FIG. 2 is a block diagram illustrating a remote controller of a circuit breaker in accordance with a first embodiment of the present invention.

FIG. 2 is a block diagram illustrating a remote controller of a circuit breaker in accordance with a first embodiment of the present invention.

As depicted in FIG. 2, the remote controller 200 of the circuit breaker includes a receiver 201 for receiving a switching control signal or trip signal (in form of radio control signal) of the circuit breaker from a maintenance man's radio communication terminal or mobile phone through a BS (base station transceiver subsystem) 100 or a transmitting station (not shown) of a radio communication network or a mobile communication network; a control unit 202 for receiving power from a power supply unit 300 and generating a first control signal and a second control signal when the trip signal is inputted from the receiver 201; a motor driver 203 for controlling switching of a circuit breaker 400 by operating a motor (not shown) installed at the inside or outside of the circuit breaker 400 according to the first control signal; and a trip unit 204 for tripping the circuit breaker 400 according to the second control signal. Herein, the receiver 201, the control unit 202, the motor driver 203 and the trip unit 204 can be installed at the inside or the outside of the circuit breaker 400. The receiver 201 can be constructed as a Radio Frequency Modulator/Demodulator (abbreviated as RF Modem.) or a Mobile Modulator/Demodulator(abbreviated as Mobile Modem.), the control unit 202 can be constructed as a microprocessor, and the motor driver 203 can be constructed as a motor driver circuit for generating a command signal for running or stopping the motor according to the control signal from the control unit 202. The trip unit 204 is for actuating the switching mechanism of the circuit breaker by converting electric energy according to the control signal of the control unit 202 into mechanical energy, it comprises a trip coil for being magnetized by the control signal and providing a pulling force and a trip actuator pulled by the pulling force of the trip coil and generating a mechanical driving force; a trip bar operated by the trip actuator; and a latch holder, etc. movable to a latch lock position and a latch unlock position by the trip bar. And, the switching mechanism comprises a movable contactor and a fixed contactor corresponding to a switch contact; a latch as an actuating unit for switching the movable contactor; a link connected to the latch and the movable contactor; and a spring for separating the movable contactor from the fixed contactor by providing elastic energy when the latch is unlocked. Because the above-described construction and operation are well known as the conventional art, further detailed explanation will be omitted.

Herein, the term "trip" means cutting off a circuit between the electric source and the electric load by sensing over current on the circuit or a control signal and power, automatically magnetizing the trip coil and separating the movable contactor from the fixed contactor. The trip signal is a signal for controlling the trip operation of the circuit breaker. In more detail, when the trip signal is transmitted, the trip coil is magnetized, when the trip signal is not transmitted, the trip coil is demagnetized.

Hereinafter, the operation of the controller 200 of the circuit breaker will be described in detail with reference to accompanying FIGS. 2~3.

Figure 3:
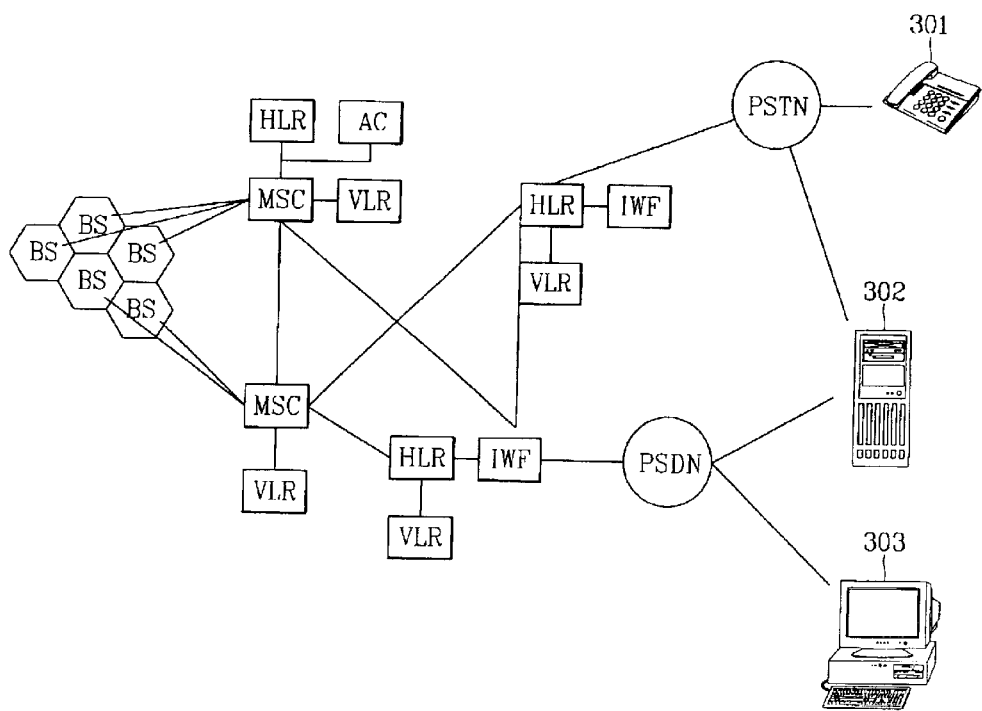
FIG. 3 is a structure map of a communication network in accordance with the present invention.

FIG. 3 is a structure map of a communication network in accordance with the present invention. In more detail, it illustrates a communication network for transmitting the trip signal to the receiver 201.

As depicted in FIG. 3, the maintenance man can control the operation of the circuit breaker 400 through one of a wire telephone 301, a radio terminal, a mobile phone 302, a beeper (not shown) and a computer 303. For example, when the maintenance man contacts to the receiver 201 with the mobile phone through a general mobile communication network, the base station 100 transmits the trip signal to the receiver 201.

Herein, the general communication network can be constructed as an AC (Authentication Center, abbreviated as AC) for checking a subscriber (whether or not); a VLR (Visitor Location Register) for registering and providing a transmitter's position; a BS (Base Station Transceiver Subsystem) for radio relay; a HLR (Home Location Register) for registering and providing a receiver's position; a MSC (Mobile Switching Center) for mobile communication switching; an IWF (Inter-Working Function) for radio frequency data communication; a Public Service Telecommunication Network; and a Public Data Communication Network. Besides the wire and radio communication networks such as shown on FIG. 3, it is possible to construct a mobile communication network with a mobile communication base station and the maintenance man's mobile phone. And, it is also possible to construct an Internet communication network using a personal computer and the Internet network. Because those communication networks are well known, further detailed description will be omitted.

Hereinafter, transmitting the trip signal to the receiver of the circuit breaker 400 by using the maintenance man's mobile phone will be described in detail.

First, the maintenance man placed at a remote place transmits a trip signal to the receiver 201 of the circuit breaker 400 by using the mobile phone. In more detail, when the maintenance man inputs a characteristic identifier of each circuit breaker through the mobile phone, the maintenance man can contact to the receiver 201 of the corresponding circuit breaker 400 through the communication network. Herein, when the maintenance man inputs a "1" key for controlling the motor controller 204 to turn on or turn off the circuit breaker 400 or a "2" key for controlling the operation of the trip unit 204 through the mobile phone, the control signal to the motor controller 204 or the trip signal to the trip unit 204 is transmitted to the controller 200 of the corresponding circuit breaker 400 through the base station 100 of the communication network.

Hereinafter, the operation of the controller 200 of the circuit breaker 400 will be described in detail.

First, the receiver 201 receives the control signal or the trip signal to the transmitted from the base station 100 and outputs the control signal or the trip signal to the control unit 202. Herein, the receiver 201 is for receiving a characteristic frequency, it receives the control signal or the trip signal transmitted from the maintenance man's mobile phone through the base station or transmitting station of the mobile communication network. In addition, the receiver 201 can be a receiver circuit of a wire telephone or a radio terminal or a beeper or a computer. For example, after separating the receiver circuit from the mobile telephone, the separated receiver circuit can be used as the receiver 201.

When the control signal or the trip signal is input from the receiver 201 to the control unit 202, the control unit 202 receives electric power from the power supply unit 300 and generates a first and a second control signals. In more detail, when the maintenance man inputs the "1" key, the control unit 202 generates the first control signal and outputs the generated first control signal to the motor driver 203. In addition, when the maintenance man inputs the "2" key, the control unit 202 generates the second control signal and outputs the generated second control signal to the trip unit 204.

Afterward, the motor driver 203 controls the operation of the circuit breaker 400 according to the first control signal from the control unit 202 so that the circuit breaker 400 may open or close the circuit between the electric source and the electric load by operating a motor (not shown) installed at the inside or the outside of the circuit breaker 400. For example, after receiving the first control signal, the motor driver 203 drives the motor to move the movable contactor connected to the circuit breaker 400 to a circuit breaking position, thus the circuit between the electric source and the electric load can be opened or closed.

The trip unit 204 trips the circuit breaker 400 according to the second control signal outputted from the control unit 202. Herein, as the trip unit 204, a voltage trip unit for tripping the circuit breaker 400 according to the electric signal or an under voltage trip unit for tripping the circuit breaker 20 can be used when the voltage is not greater than a predetermined level or power supplied to the trip unit is ceased.

In the meantime, the maintenance man can transmit a pre-stored maintenance man's audio signal to the receiver 201 of the corresponding circuit breaker 400 by using the administrator's mobile phone. Herein, an audio recognition unit is installed at the receiver 201. In more detail, when the same audio signal as the pre-stored maintenance man's audio signal is inputted through the receiver 201, the operation of the motor driver 203 or the trip unit 204 are controlled according to the maintenance man's audio signal. It will be described in more detail with reference to accompanying FIG. 4.

Figure 4:
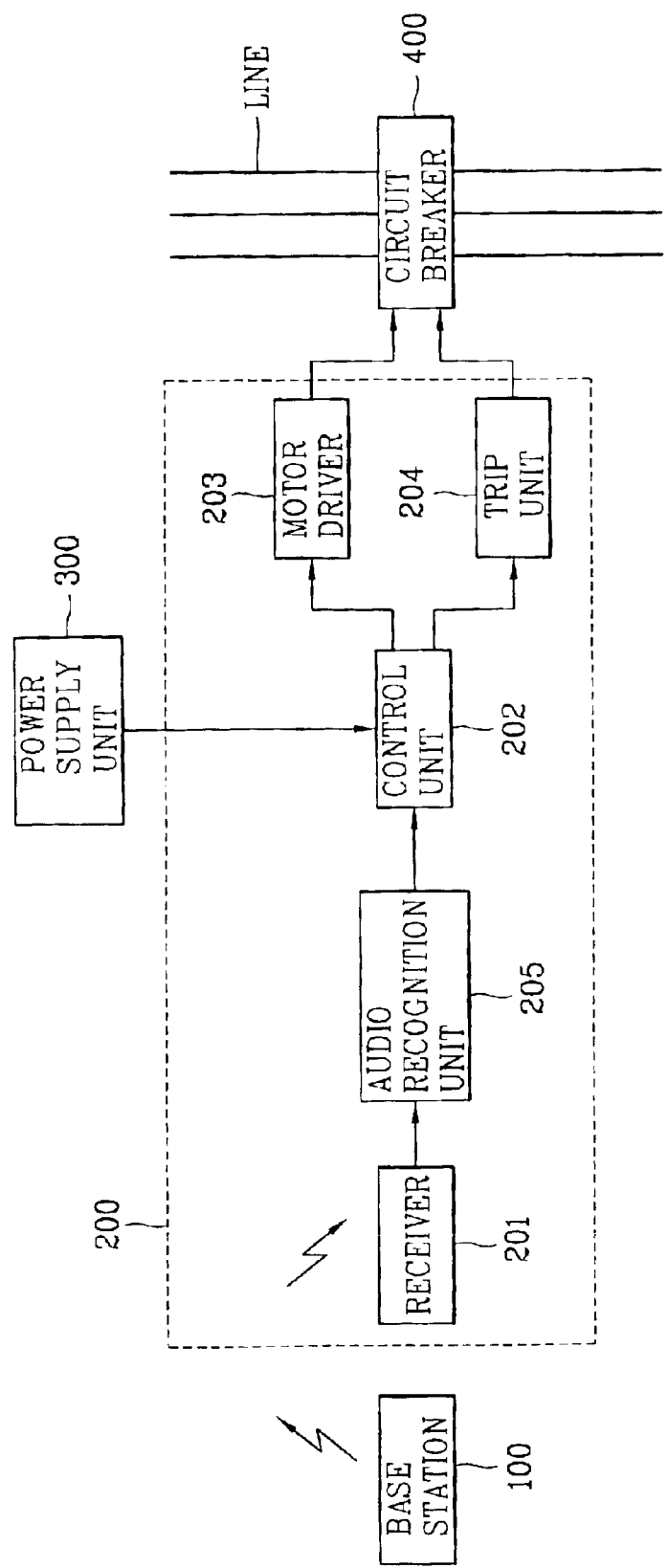
FIG. 4 is a block diagram illustrating a remote controller of a circuit breaker in accordance with a second embodiment of the present invention.

FIG. 4 is a block diagram illustrating a remote controller of a circuit breaker in accordance with a second embodiment of the present invention. In more detail, the controller of the circuit breaker in accordance with the second embodiment of the present invention further includes an audio recognition unit 205 installed between the receiver 201 and the control unit 202.

As depicted in FIG. 4, the controller of the circuit breaker includes a receiver 201 for receiving a radio control signal having a first audio signal or a second audio signal transmitted through a radio communication base station; an audio recognition unit 205 for outputting the first audio signal or the second audio signal when the first audio signal or the second audio signal inputted through the receiver 201 is same as a pre-stored maintenance man's audio signal; a control unit 202 for outputting a first control signal for controlling the operation of the motor driver 203 by receiving the first audio signal or outputting a second control signal for controlling the operation of the trip unit 204 by receiving the second audio signal; a motor driver 203 for controlling the operation of the circuit breaker 400 to open or close the circuit between the electric source and the electric load by operating a motor (not shown) installed at the inside or the outside of the circuit breaker 400 according to the first control signal; and a trip unit 204 for tripping the circuit breaker 400 according to the second control signal. Hereinafter, the operation of the controller of the circuit breaker in accordance with the second embodiment of the present invention will be described in detail with reference to accompanying FIG. 4.

First, in order to control the motor driver 203, the maintenance man inputs a first audio signal (for example, the maintenance man says "No. 1") or a second audio signal (for example, the maintenance man says "No.2"), the control signal including the first or the second audio signal is transmitted to the receiver 201 of a corresponding circuit breaker. Herein, the receiver 201 receives the control signal on the basis of a characteristic identifier of the circuit breaker 400.

The receiver 201 receives the control signal and outputs the first or the second audio signal to the audio recognition unit 205. Herein, when the first or the second audio signal inputted through the receiver 201 is the same as the pre-stored maintenance man's audio signal, the audio recognition unit 205 outputs the first or the second audio signal to the control unit 202.

When the control unit 202 receives the first audio signal, it outputs a first control signal for controlling the operation of the motor driver 203 or when it receives the second audio signal, it outputs a second control signal for controlling the operation of the trip unit 204.

As described above, in the present invention, because the maintenance man can transmit a control signal through a BS (Base Station Transceiver Subsystem) for radio communication by using a communication unit and control the operation of a circuit breaker by a control signal, the maintenance man does not have to approach a control board or a control room.

In addition, in the present invention, because the maintenance man can transmit a control signal through the BS for radio communication by using a communication unit and control the operation of a circuit breaker by a control signal, the maintenance man can control the operation of the circuit breaker instantly in an emergency.

In addition, in the present invention, because the maintenance man can transmit a control signal through the BS for radio communication by using a communication unit and control the operation of a circuit breaker by a control signal, the maintenance man can easily test or operate the circuit breaker without approaching a control board or a control system.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A remote controller of a circuit breaker, comprising:
   a receiver for receiving a radio control signal for turning on/off or tripping a circuit breaker;
   a control unit for generating a first control signal or a second control signal depending on the radio control signal inputted from the receiver;
   a motor driver for controlling the on/off operation of the circuit breaker depending on the first control signal; and
   a trip unit for tripping the circuit breaker depending on the second control signal.

2. The controller of claim 1, wherein the radio control signal is transmitted from a base station or a transmitting station of a mobile communication network by a mobile phone of a maintenance man.

3. The controller of claim 1, wherein the radio control signal is transmitted from a base station or a transmitting station of a mobile communication network by one of a mobile phone, a wire/radio telephone, a computer or a beeper.

4. The controller of claim 1, wherein the radio control signal includes a first and second audio signals.

5. The controller of claim 4, further comprising:
   an audio recognition unit for outputting the first and the second audio signals to the control unit when the first and the second audio signals are the same as pre-stored audio signals.

6. The controller of claim 4, wherein the control unit generates the first control signal depending on the first audio signal and generates the second control signal depending on the second audio signal.

7. The controller of claim 1, wherein the receiver receives the radio control signal depending on an identifier of the circuit breaker.

8. The controller of claim 1, wherein the motor driver controls the operation of the circuit breaker by operating a motor installed at the inside or the outside of the circuit breaker according to the first control signal.

9. A remote controller of a circuit breaker, comprising:
a receiver for receiving an identifier of a circuit breaker and a radio control signal;
a control unit for generating a first control signal or a second control signal on the basis of the radio control signal inputted from the receiver;
motor driver for controlling on or off operation of the circuit breaker depending on the first control signal; and
a trip unit for tripping the circuit breaker depending on the second control signal.

10. The controller of claim 9, wherein the identifier and the radio control signal are inputted from one of a mobile phone, a radio terminal, a personal computer or a beeper.

11. The controller of claim 9, wherein the radio control signal includes a first and second audio signals.

12. The controller of claim 11, further comprising:
an audio recognition unit for outputting the first and the second audio signals to the control unit when the first and the second audio signals are the same as pre-stored audio signals.

13. The controller of claim 11, wherein the control unit generates the first control signal depending on the first audio signal and generates the second control signal depending on the second audio signal.

14. A remote controller of a circuit breaker, comprising:
a receiver for receiving a radio audio control signal;
an audio recognition unit for outputting the first and the second audio signals when the first and the second audio signals of the radio audio control signal are the same as pre-stored audio signals;
a control unit for generating a first control signal depending on the first audio signal and generating a second control signal depending on the second audio signal;
a motor driver for controlling on or off operation of the circuit breaker depending on the first control signal; and
a trip unit for tripping the circuit breaker depending on the second control signal.

15. The controller of claim 14, wherein the receiver receives the radio audio control signal from a base station or a transmitting station for radio communication.

16. The controller of claim 14, wherein the radio audio control signal is inputted from one of a mobile phone, a radio terminal, a personal computer or a beeper.

17. The controller of claim 14, wherein the receiver receives the radio audio control signal depending on an identifier of the circuit breaker.

18. In a remote controller of a circuit breaker including a motor driver for controlling on/off operation of a short circuit breaker according to a radio control signal inputted through a radio communication network and a trip unit for tripping the circuit breaker according to the radio control signal, further comprising:
a receiver for receiving the radio control signal transmitted through a radio communication network from a radio terminal of a maintenance man; and
a control unit for generating a first or a second control signal depending on the radio control signal inputted from the receiver, outputting the generated first control signal to the motor driver and outputting the generated second control signal to the trip unit.

19. The controller of claim 18, wherein the receiver receives the radio control signal depending on an identifier of the circuit breaker.

\* \* \* \* \*